United States Patent [19]

Kinoshita et al.

[11] Patent Number: 4,772,914

[45] Date of Patent: Sep. 20, 1988

[54] ELECTROPHOTOGRAPHIC COPYING APPARATUS

[75] Inventors: Naoyoshi Kinoshita, Aichi; Kaoru Hashimoto, Toyohashi, both of Japan

[73] Assignee: Minolta Camera Kabushiki Kaisha, Osaka, Japan

[21] Appl. No.: 136,506

[22] Filed: Dec. 28, 1987

Related U.S. Application Data

[63] Continuation of Ser. No. 19,177, Feb. 26, 1987, abandoned.

[30] Foreign Application Priority Data

Feb. 28, 1986 [JP] Japan .................................. 61-45015

[51] Int. Cl.[4] .................................. G01G 15/00

[52] U.S. Cl. .................................. 355/3 R; 355/14 R; 355/14 CH

[58] Field of Search .................. 355/3 R, 14 R, 3 CH, 355/14 CH, 3 TR, 14 TR

[56] References Cited

U.S. PATENT DOCUMENTS 4,017,170 4/1977 Komori et al. .................... 355/3 R
4,204,725 5/1980 Di Stefano et al. ........... 355/14 CH
4,408,871 10/1983 Kojima ............................ 355/14 R
4,433,297 2/1984 Buchheit ........................ 355/14 CH
4,512,652 4/1985 Buck et al. ..................... 355/14 CH
4,551,009 11/1985 Shigemura et al. .................. 355/15

FOREIGN PATENT DOCUMENTS 56-89753 7/1981 Japan .
49-1234 1/1987 Japan .
62-49628 10/1987 Japan .

*Primary Examiner*—A. C. Prescott
*Attorney, Agent, or Firm*—Burns, Doane, Swecker & Mathis

[57] ABSTRACT

An electrophotographic copying apparatus which is so arranged that control of its copying functions has been simplified for efficient copying operation by reducing the number of signals for controlling the copying functions, whereby respective devices for corona charging, transferring, separating and developing may be controlled by a single signal, while the number of high voltage sources for supplying power to the corona charger, transfer charger, separating charger and developing sleeve, etc. has also been reduced for simplification.

17 Claims, 5 Drawing Sheets

ELECTROPHOTOGRAPHIC COPYING APPARATUS

This application is a continuation, of application Ser. No. 019,177, filed Feb. 26, 1987 now abandoned.

BACKGROUND OF THE INVENTION

The present invention generally relates to electrophotography and more particularly, to an electrophotographic copying apparatus and control thereof.

Generally, an electrophotographic copying apparatus is provided with a photoreceptive drum having a photosensitive or photoreceptor layer formed on the peripheral outer surface thereof and rotatably disposed so as to be driven in a predetermined direction, and processing devices such as a corona charger for uniformly charging the photosensitive layer, a developing device for developing an electrostatic latent image formed on the photosensitive layer into a visible toner image by feeding toner thereonto, a transfer charger for transferring the toner image formed on the photosensitive layer onto a copy paper sheet, a separating charger for separating the copy paper sheet attracted onto the photosensitive layer therefrom, and a charge erasing device for erasing charge remaining on the photosensitive layer, etc., which are sequentially disposed around the photoreceptive drum for carrying out the copying operation. Moreover, a motor for driving the photoreceptive drum for rotation, and the corona charger, developing device, transfer charger, separating charger and charge erasing device, etc. are respectively connected to corresponding responding power sources for energization at separate timings.

More specifically, in the conventional electrophotographic copying apparatus, the devices as described above are arranged in a manner as illustrated, for example, in FIG. 1.

In the known arrangement of FIG. 1, respective high voltage sources HV1, HV2, HV3 and HV4 for feeding power to the corona charger 3, transfer charger 5, separating charger 6, and developing sleeve 4 which are provided in the vicinity of the photoreceptive drum 1, a circuit 12 for controlling the motor M, and a power source 11 for feeding power to the charge erasing device 2 are respectively controlled by $\overline{\text{HV1}}$ signal, $\overline{\text{HV2}}$ signal, $\overline{\text{HV3}}$ signal branched from $\overline{\text{HV2}}$ signal, $\overline{\text{HV4}}$ signal, $\overline{\text{motor}}$ signal and $\overline{\text{Er}}$ signal which are generated by a control means CPU (central processing unit).

The output timings of the above respective signals are as shown in a timing chart of FIG. 2. More specifically, for starting the copying operation, the power source HV4 for the developing device 4 is actuated simultaneously with the starting of the motor M. Taking account of inertia inherent in the motor M, said motor M starts rotation after rising of the developing bias voltage. By energizing the developing bias voltage before rotation of the motor, toner is prevented from adhering onto the photosensitive layer 1*a* of the photoreceptive drum 1. Thereafter, the other high voltage sources HV1, HV2, HV3 and the eraser lamp power source 11 are actuated for effecting the copying.

For completion or termination of the copying, the power source HV1 for the corona charger 3 is first suspended. Subsequently, after passing of the copy paper sheet over the transfer charger 5 and separating charger 6, the respective power sources HV2 and HV3 therefor are simultaneously stopped. Then, after completion of charge erasing for the photosensitive layer 1*a* from the transfer position to the erasing position, the eraser lamp 2 and the motor M are stopped. Since the motor M requires some time before stopping by inertia, the power source HV4 for the developing device 4 is suspended after the motor M has stopped. The purpose for stopping the developing device 4 at the last stage is to prevent toner from adhesion onto photosensitive surface 1*a* by the residual charge in the similar manner as in the starting of copying operation.

However, in the conventional arrangement as described above, since the timings for energizing and deenergizing the respective loads are different from each other, it is necessary to output respectively different energizing signals therefor, and thus, there has been such a problem that a plurality of output terminals are required for outputting a plurality of signals, thus resulting in a complication of the control circuit.

SUMMARY OF THE INVENTION

Accordingly, an essential object of the present invention is to provide an electrophotographic copying apparatus in which control of its copying functions has been simplified for efficient copying operation.

Another important object of the present invention is to provide an electrophotographic copying apparatus of the above described type in which the simplification of the control is effected by reducing the number of signals for controlling the copying functions.

A further object of the present invention is to provide an electrophotographic copying apparatus of the above described type which is capable of controlling respective devices for corona charging, transferring, separating and developing by a single signal.

A still further object of the present invention is to provide an electrophotographic copying apparatus of the above described type in which the number of high voltage sources for supplying power to the corona charger, transfer charger, separating charger, and developing sleeve, etc. has been reduced for simplification of construction and reduction in cost.

Another object of the present invention is to provide an electrophotographic copying apparatus of the above described type which is free from adhesion of toner unnecessarily onto the photosensitive surface, with a simplification in the control of the copying operation.

In accomplishing these and other objects, according to one preferred embodiment of the present invention, there is provided a copying apparatus which includes a photosensitive member provided rotatably, a charging means for charging the photosensitive member uniformly, means for forming an electrostatic latent image on the uniformly charged photosensitive member, a developing means for developing the electrostatic latent image with a sleeve rotatably provided beside the photosensitive member, an erasing means provided upstream to the charging means for erasing the surface potential of the photosensitive member, a driving means for driving the photosensitive member, a first electric power source for supplying bias voltage to the sleeve, a second electric power source for supplying high voltage to the charging means, a third electric power source for supplying voltage to the erasing means, and means for generating a first signal to energize both the first electric power source and second electric power source simultaneously, and for generating a second signal to energize the third electric power source and for generating a third signal to energize the driving means, and characterized in that, at the starting of copying process, the third signal is generated after the generation of the second signal, so that the photosensitive member starts to rotate after the erasing means becomes capable of sufficiently effecting the function thereof, and at the termination of copying process, the second signal is turned off after the photosensitive member is substantially stopped rotating as a result of the turning off of the third signal.

By the above arrangement according to the present invention, an improved electrophotographic copying apparatus has been advantageously presented through simple construction and at low cost.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
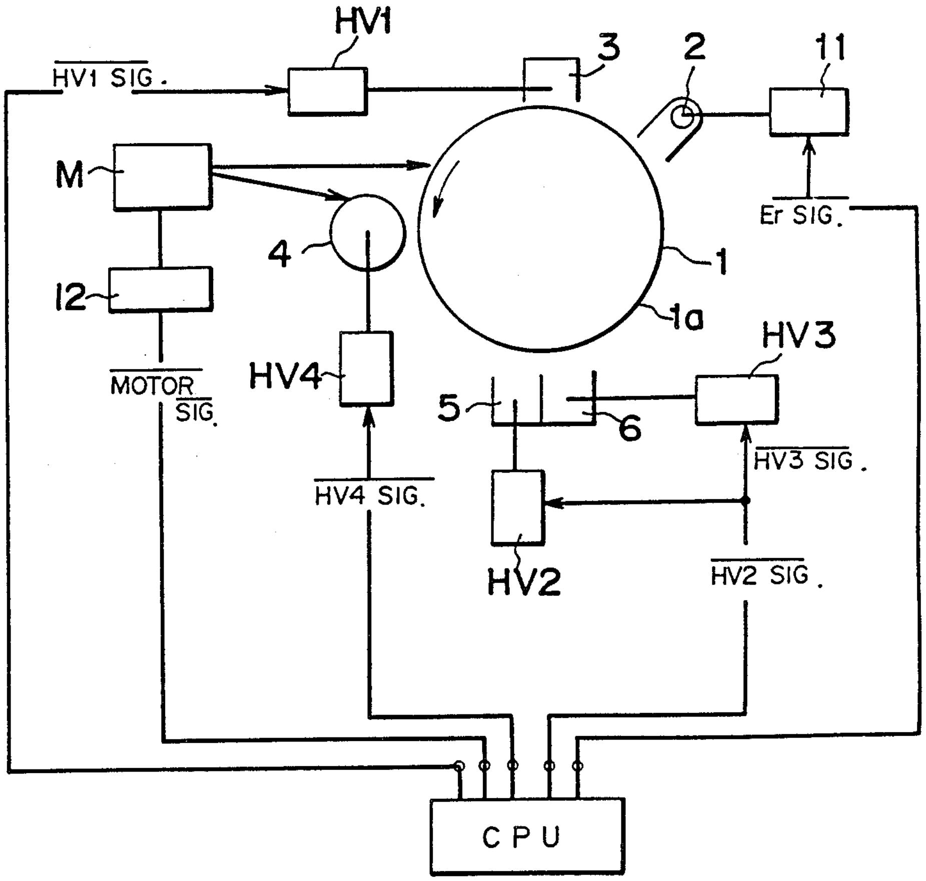
Fig. 1 PRIOR ART
FIG. 1 is a schematic diagram showing an arrangement around a photoreceptive drum in a conventional electrophotographic copying apparatus (already referred to)
Figure 2:
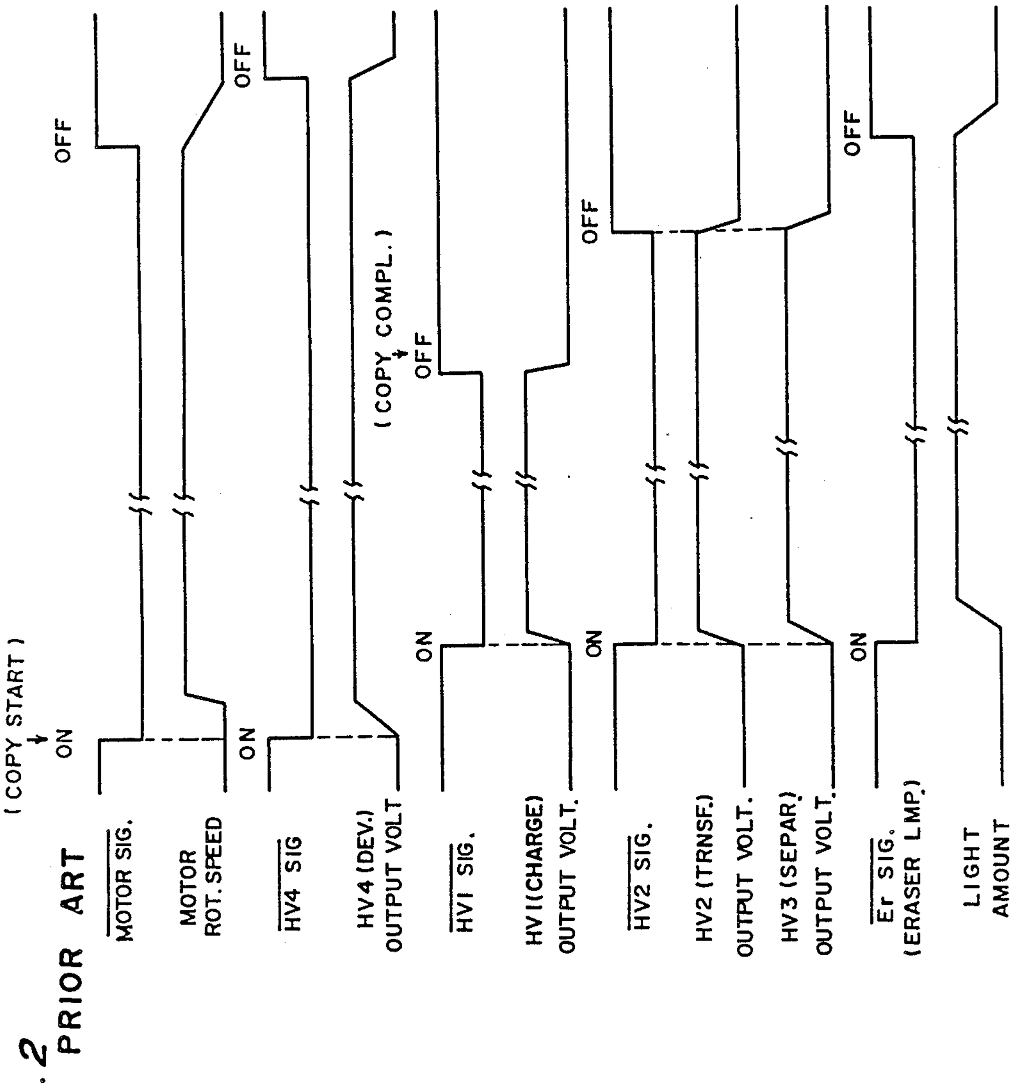
Fig. 2 PRIOR ART
FIG. 2 is a timing chart for explaining the control process of the conventional electrophotographic copying apparatus (already referred to)

Before the description of the present invention proceeds, it is to be noted that like parts are designated by like reference numerals throughout the accompanying drawings.

Figure 3:
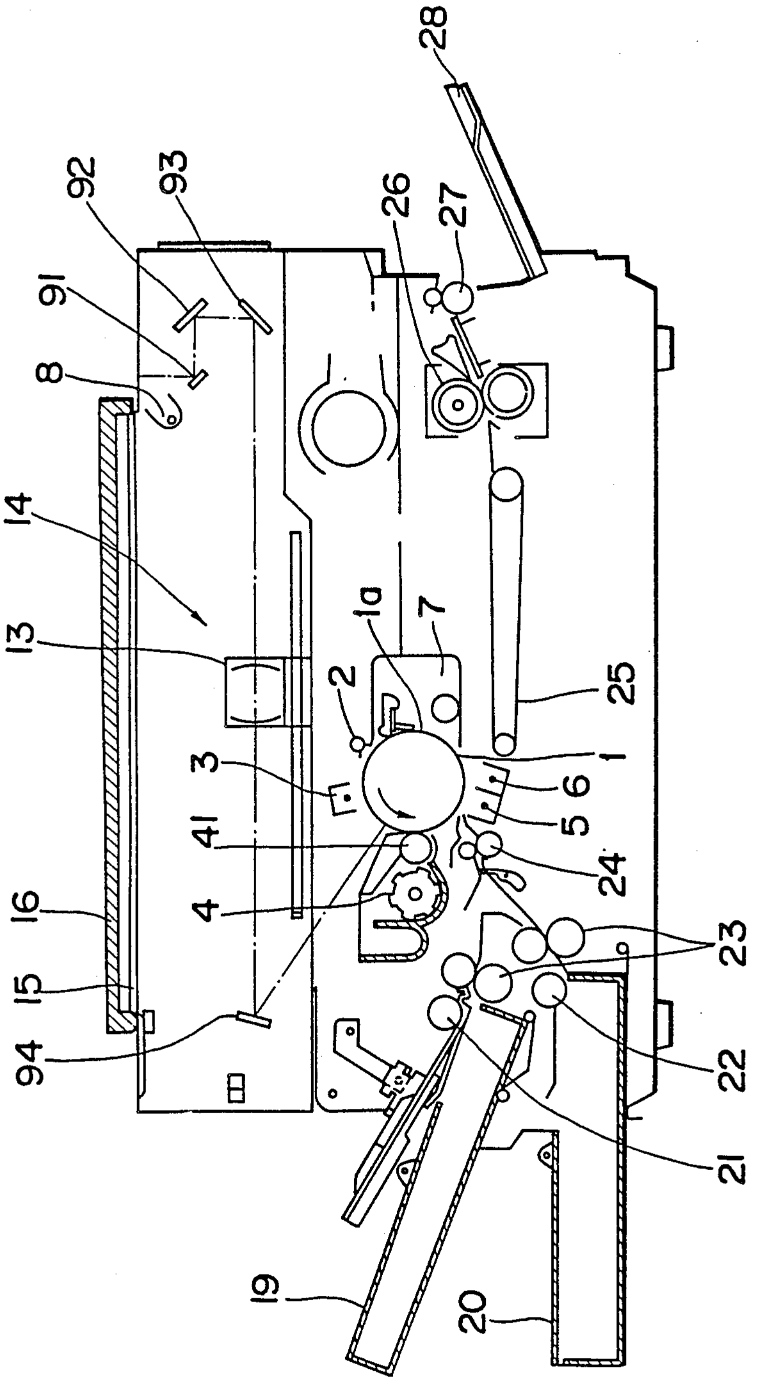
FIG. 3 is a schematic side sectional view showing a general construction of an electrophotographic copying apparatus according to one preferred embodiment of the present invention.

Referring now to the drawings, there is shown in FIG. 3 an electrophotographic copying apparatus according to one preferred embodiment of the present invention. The copying apparatus generally includes a photoreceptive drum 1 having a photosensitive or photoreceptor layer 1*a* formed on the peripheral surface thereof, and disposed generally at a central portion of the apparatus housing so as to be driven for rotation in a counterclockwise direction as indicated by an arrow, around which various processing devices such as an eraser lamp 2 for removing residual charge remaining on the photosensitive layer 1*a* corona charger 3 for preliminarily charging the photosensitive layer 1*a* uniformly, a developing device 4 having a developing sleeve 41 for developing an electrostatic latent image formed on the photosensitive layer 1*a* into a visible toner image, a transfer charger 5 for transferring the developed toner image onto a copy paper sheet, a separating charger 6 for separating the copy paper sheet from the photosensitive layer 1*a* and a cleaner 7 for cleaning said photosensitive layer 1*a*, etc. are sequentially disposed generally in the similar manner as in the conventional arrangement referred to with respect to FIG. 1.

In a position above and adjacent to the photoreceptive drum 1, there is provided an optical system 14 including an exposure lamp 8, reflecting mirrors 91, 92, 93 and 94 and a projecting lens 13, and adapted to scan an original document (not particularly shown) held between an original document platform 15 of a transparent material and a presser plate 16 which are provided at the uppermost portion of the copying apparatus above said optical system 14 for successively projecting the scanned image onto the preliminarily uniformly charged photosensitive layer 1*a* so as to form an electrostatic latent image of the original document on the surface of said photosensitive layer 1*a*.

Meanwhile, at the lower portion of a housing of the copying apparatus, there are sequentially provided from the left side toward the right side, paper feeding cassettes 19 and 20, paper feeding rollers 21 and 22, intermediate rollers 23, timing rollers 24, a transport belt 25, a fixing device 26, paper discharge rollers 27, and a paper discharge tray 28 generally in a known manner.

In the above arrangement, the photosensitive layer 1*a* of the drum 1 is subjected to light projection by the eraser lamp 2 for removal of residual charge therefrom, and is then uniformly charged by the corona charger 3, so as to be subsequently formed with the electrostatic latent image of the original document by the image exposure through the optical system 14. The developing device 4 converts the electrostatic latent image formed on the photosensitive layer 1*a* into the visible toner image. When the toner image thus formed approaches the transfer charger 5 as the photoreceptive drum 1 rotates, the copy paper sheet (not particularly shown) fed in synchronization therewith closely adheres onto the photosensitive layer 1*a* at the transfer section, and through the corona discharge by the corona charger 5, the toner image is transferred onto the copy paper sheet, which is then separated from the photosensitive layer 1*a* through corona discharge by the separating charger 6 and by the toughness or resiliency of the copy paper sheet itself. Subsequently, the copy paper sheet is fed up to the fixing device 26 whereat the toner image is fixed onto said copy paper sheet. The cleaner 7 is arranged to remove the residual toner remaining on the photosensitive layer 1*a*.

Figure 4:
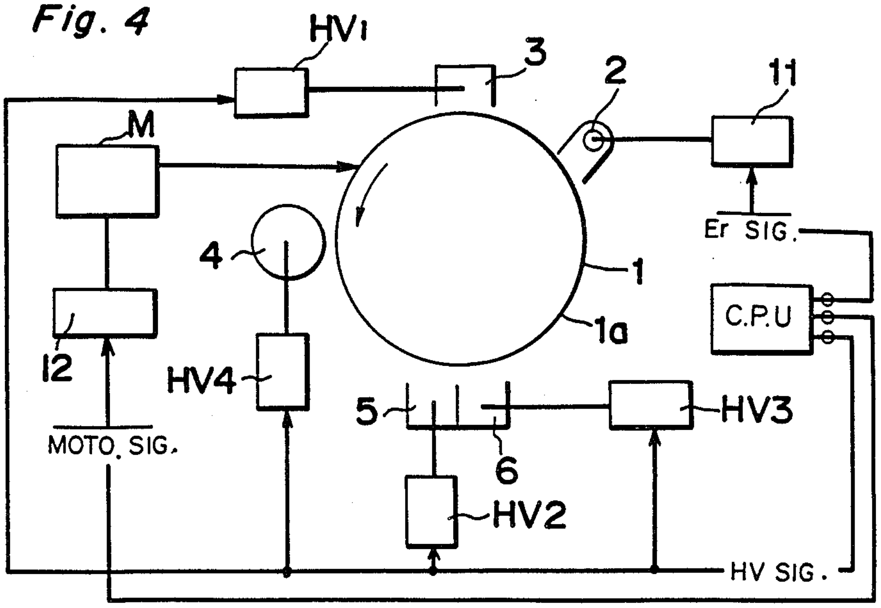
FIG. 4 is a schematic diagram showing the photoreceptive drum and general arrangement therearound in the copying apparatus of the present invention.

Referring also to FIG. 4, there is shown a schematic diagram illustrating the photoreceptive drum and general arrangement therearound in the copying apparatus according to the present invention, with like parts in FIG. 1 being designated by like reference numerals and symbols.

The eraser lamp 2 provided in the vicinity of the photoreceptive drum 1 is supplied with power by the power source 11 connected thereto, and the corona charger 3 is fed with power by the high voltage power source HV1 also connected thereto. The developing device 4 is supplied with power by the developing bias high voltage source HV4, and the transfer charger 5 is fed with power by the high voltage power source HV2, while the separating charger 6 is also fed with power by the high voltage power source HV3. The motor M for driving the photoreceptive drum 1 for rotation is driven through the motor driving circuit 12.

Meanwhile, the control means CPU (central processing unit) is provided to produce the HV signal for controlling the respective high voltage power sources HV1 to HV4, motor signal for controlling the motor M, and Er signal for controlling the eraser lamp 2 as shown.

Accordingly, the control of the processing devices, such as corona charger 3, developing device 4, transfer charger 5, separating charger 6 and charge erasing device 2 is effected by the three kinds of signals for the motor M, eraser lamp 2, and respective power sources as described above.

Figure 5:
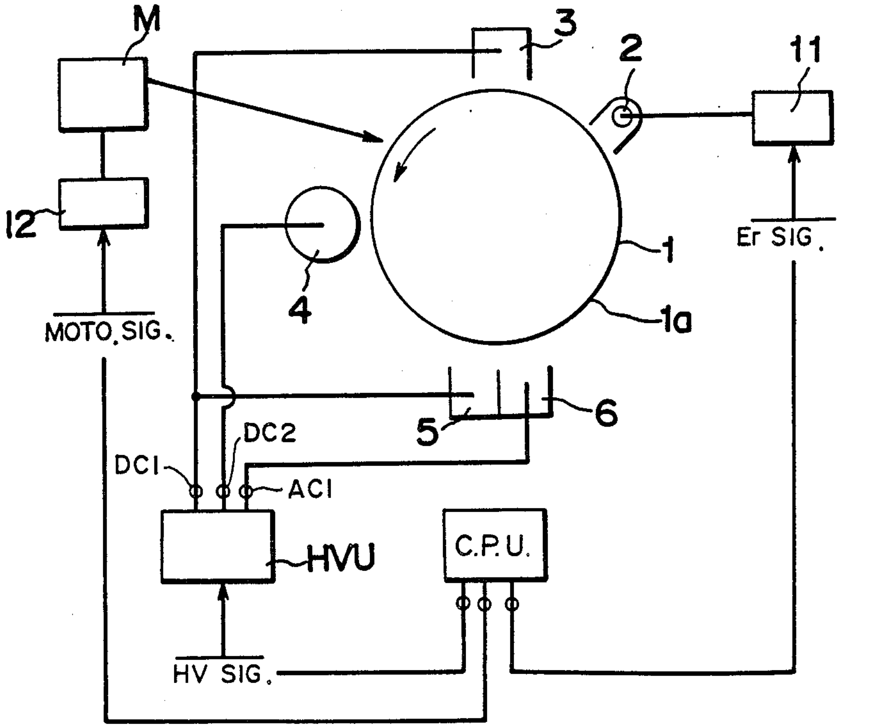
FIG. 5 is a diagram similar to FIG. 4, which particularly shows a modification thereof.

It is to be noted here that, in the foregoing embodiment, although the power sources HV1 to HV4 are respectively provided for the corona charger 3, transfer charger 5, separating charger 6 and developing device 4 as shown in FIG. 4, the arrangement may be so modified as in a circuit of FIG. 5, in which the power sources HV1 to HV4 are replaced by a composite type high voltage source HVU in the form of a unit having three output terminals, comprising a first DC terminal DC1 for supplying DC voltage to the corona charger 3 and transfer charger 5, a second terminal DC2 for supplying bias voltage to the developing device 4, and a third terminal AC1 for supplying AC voltage to the separating charger 6.

Figure 6:
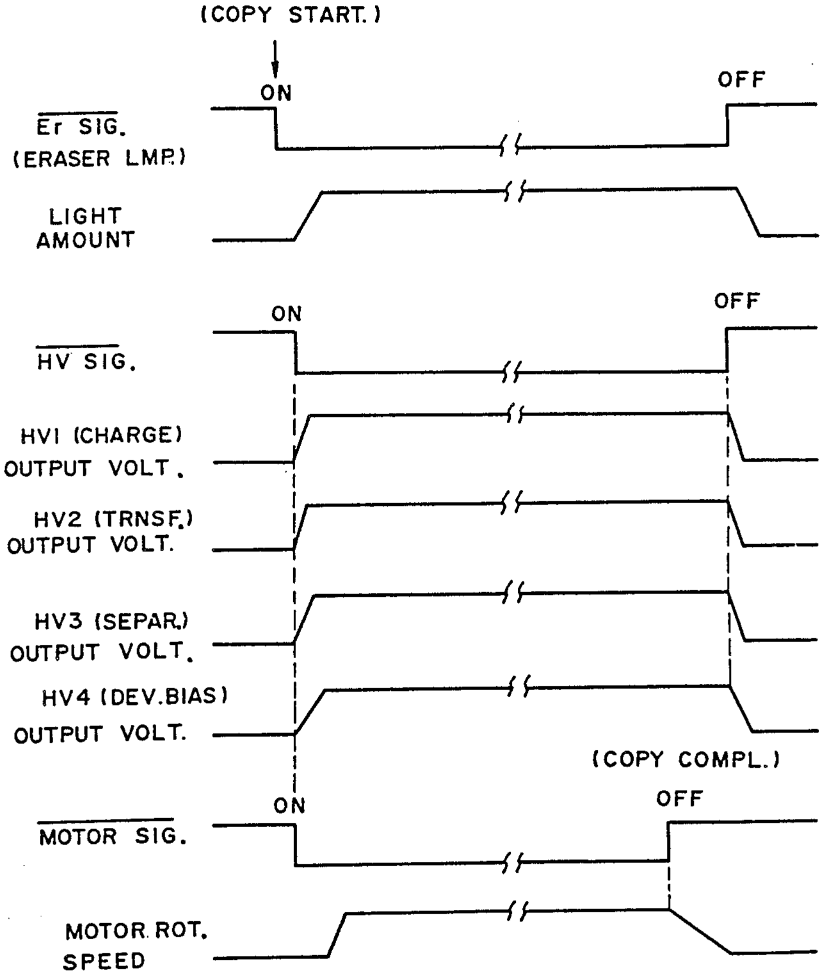
FIG. 6 is a timing chart for explaining the control process of the electrophotographic copying apparatus according to the present invention.

FIG. 6 shows a timing-chart for the control of the copying functions in the copying apparatus of the present invention of FIG. 4.

The control according to the present invention is characterized in that, in addition to effecting the control of the respective high voltage sources by the same signal, the high voltage sources and eraser lamp 2 are adapted to be actuated before rotation of the motor M at the starting of copying, while at the completion of copying, the high voltage source stopping signal is emitted after the motor stopping signal, and the eraser lamp 2 is de-energized after complete stopping of rotation of the motor M.

Upon depression of a print button (not shown), copying function is started. In the first place, the power source 11 for the eraser lamp 2 is actuated. Subsequent to application of the Er signal to the power source 11 of the eraser lamp 2, the HV signal common to the respective high voltage power sources, i.e., the high voltage sources HV1, HV2, HV3 and HV4 for the corona charging, transfer charging, separation and developing bias, and the motor signal for the motor M are applied.

The timings as described above are adopted by the reasons as follows. Specifically, the eraser lamp 2 is not brought into the stabilized state until after about 40 milliseconds subsequent to the application of the $\overline{Er}$ signal to the power source 11, and the motor M also substantially starts rotation after about more than 40 milliseconds subsequent to actuation of the motor driving circuit 12. The eraser lamp 2 must be raised in performance to such an extent as is capable of erasing the charge before starting rotation of the motor M, because, owing to the fact that the respective high voltage sources HV1 to HV4 are controlled by one timing, the charge as applied by the transfer charger 5 remains on the photosensitive layer 1*a* at the portion thereof from the transfer position to the charge erasing position upon stopping of the rotation of the photoreceptive drum, and thus, it is required to completely erase the charge remaining at the starting of the photoreceptive drum 1. Moreover, since there is a possibility that toner adheres also to the photosensitive layer 1*a*, in the case where the developing bias is to be raised, it is so arranged that the developing bias voltage HV4 has been raised before the motor M starts rotation. By the above practice, undesirable adhesion of toner can be prevented so as to eliminate wasteful consumption of toner. It should also be noted here that the rising of the developing bias voltage and illumination of the eraser lamp 2 may be effected at any time before rotation of the motor M, but for reducing damage to the photosensitive layer, the rising of the developing bias voltage should be made immediately before starting of rotation of the motor M.

Subsequently, for completion of the copying operation, the stopping signal for the motor M is first applied to the driving circuit 12 for the motor M. The motor M is gradually reduced in its speed by inertia so as to be stopped after approximately 200 milliseconds. During 200 milliseconds, the developing bias voltage generated from high voltage HV4 should be kept energized so as to prevent toner from adhering onto photosensitive surface 1*a*.

Accordingly, in the present embodiment, the respective high voltage power sources HV1 to HV4 are stopped simultaneously with the stopping of the motor M, whereby adhesion of toner on the photosensitive layer may be prevented. Thus, the eraser lamp 2 is de-energized after stopping rotation of the motor M. This function is required because, if the de-energization of the eraser lamp 2 is effected before stopping rotation of the motor M, since the portion charged by the transfer charger 5 stops after passing through the charge erasing position, such passing portion appears as a totally black portion, thus consuming toner wastefully.

It is to be also noted that in order to reduce any damage to the photosensitive layer, it is more desirable to lower the developing bias voltage to zero immediately after stopping rotation of the motor M, and therefore, the timing may be determined by taking into account the falling of the motor M and developing bias, even before complete stopping of the motor M.

It should further be noted that, although the present invention is applicable to copying apparatuses having various kinds of photoreceptors, a photosensitive member without any memory effect, i.e., photosensitive member in which charge of the previous image is completely erased during the charge erasing is particularly preferable.

As is clear from the foregoing description, according to the present invention, control of the copying apparatus has been simplified, and adhesion of excessive toner onto the photosensitive layer is prevented, with a reduction in the number of signals for controlling the timings of the copying functions.

Furthermore, owing to the common use of the timing control signal with respect to the high voltage power sources, it becomes possible to employ a single power source unit as described earlier with reference to the modification of FIG. 5. Therefore, through decrease in the number of the high voltage power sources, the entire copying apparatus may be improved in reliability, with a consequent reduction in cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying apparatus, comprising:

a photosensitive member provided rotatably ;

a charging means for charging said photosensitive member uniformly;

means for forming an electrostatic latent image on said uniformly charged photosensitive member;

a developing means for developing the electrostatic latent image with a sleeve rotatably provided beside said photosensitive member;

an erasing means provided upstream to the charging means for erasing the surface potential of said photosensitive member;

a driving means for driving said photosensitive member;

a first electric power source for supplying bias voltage to said sleeve;

a second electric power source for supplying high voltage to said charging means;

a third electric power source for supplying voltage to said erasing means; and means for generating a first signal to energize both said first electric power source and said second electric power source simultaneously, and for generating a second signal to energize said third electric power source and for generating a third signal to energize said driving means, wherein, at the starting of copying process, said third signal is generated after the generation of the second signal, so that the photosensitive member starts to rotate after the erasing means becomes capable of sufficiently effecting the function thereof, and at the termination of copying process, said second signal is turned off after the photosensitive member is substantially stopped rotating as a result of the turning off of the third signal.

2. A copying apparatus as claimed in claim 1, wherein, at the starting of copying process, said third signal energizes said driving means after the generation of said first and second signals.

3. A copying apparatus as claimed in claim 1, wherein, at the termination of copying process, said first signal de-energizes said first and second electric power sources, and said second signal de-energizes said third electric power source after said photosensitive member is substantially stopped rotating.

4. A copying apparatus as claimed in claim 1, wherein said photosensitive member has a photosensitive layer formed by an organic compound.

5. A copying apparatus, comprising:

a photosensitive member provided rotatably;

a charging means for charging said photosensitive member uniformly;

an exposing means for forming an electrostatic latent image on said uniformly charged photosensitive member;

a developing means for developing the electrostatic latent image with a sleeve rotatably provided beside said photosensitive member;

an erasing means provided upstream to the charging means for erasing the surface potential of said photosensitive member;

a transferring means for transferring a developed image from said photosensitive member to a paper;

a separating means for separating the paper from said photosensitive member;

a driving means for driving said photosensitive member;

a first electric power source for supplying bias voltage to said sleeve;

a second electric power source for supplying high voltage to said charging means;

a third electric power source for supplying high voltage to said transferring means;

a fourth electric power source for supplying high voltage to said separating means;

a fifth electric power source for supplying voltage to said erasing means; and means for generating a first signal to energize said first, second, third and fourth electric power sources simultaneously, and for generating a second signal to energize said fifth electric power source and for generating a third signal to energize said driving means.

6. A copying apparatus as claimed in claim 5, wherein, at the starting of copying process, said third signal energizes said driving means after the generation of said second signal.

7. A copying apparatus as claimed in claim 5, wherein, at the starting of copying process, said third signal energizes said driving means after the generation of said first and second signals.

8. A copying apparatus as claimed in claim 5, wherein, at the termination of copying process, said second signal de-energizes said fifth electric power source after said photosensitive member is substantially stopped rotating.

9. A copying apparatus as claimed in claim 5, wherein, at the termination of copying process, said first signal de-energizes said first, second, third and fourth electric power sources simultaneously, and said second signal deenergizes said fifth electric power source after said photosensitive member is substantially stopped rotating.

10. A copying apparatus as claimed in claim 5, wherein said photosensitive member has a photosensitive layer formed by an organic compound.

11. A copying apparatus, comprising:

a photosensitive member provided rotatably;

a charging means for charging said photosensitive member uniformly;

an exposing means for forming an electrostatic latent image on said uniformly charged photosensitive member;

a developing means for developing the electrostatic latent image with a sleeve rotatably provided beside said photosensitive member;

an erasing means provided upstream to the charging means, for erasing the surface potential of said photosensitive member;

a transferring means for transferring a developed image from said photosensitive member to a paper;

a separating means for separating the paper from said photosensitive member;

a driving means for driving said photosensitive member;

a first electric power source of one unit for supplying bias voltage to said sleeve, and for supplying high voltage to said charging means, said transferring means and said separating means;

a second electric power source for supplying voltage to said erasing means; and means for generating a first signal to energize said first electric power source, and for generating a second signal to energize said second electric power source and for generating a third signal to energize said driving means.

12. A copying apparatus as claimed in claim 11, wherein said first electric power source supplies high voltages to said sleeve, charging means and said separating means and supplies bias voltage to said sleeve simultaneously in response to the first signal.

13. A copying apparatus as claimed in claim 11, wherein, at the starting of copying process, said third signal energizes said driving means after the generation of said second signal.

14. A copying apparatus as claimed in claim 11, wherein, at the starting of copying process, said third signal energizes said driving means after the generation of said first and second signals.

15. A copying apparatus as claimed in claim 11, wherein, at the termination of copying process, said second signal de-energizes said third electric power source after said photosensitive member is substantially stopped rotating.

16. A copying apparatus as claimed in claim 11, wherein, at the termination of copying process, said first and second signals de-energize said first and second electric power sources, respectively, after said photosensitive member is substantially stopped rotating.

17. A copying apparatus as claimed in claim 11, wherein said photosensitive member has a photosensitive layer formed by an organic compound.

* * * * *